US010030767B2

(12) United States Patent
Riesenmey et al.

(10) Patent No.: US 10,030,767 B2
(45) Date of Patent: Jul. 24, 2018

(54) DEVICE AND METHOD FOR CONTROLLING AN AUTOMATIC TRANSMISSION DURING CORNERING

(71) Applicant: RENAULT s.a.s, Boulogne-Billancourt (FR)

(72) Inventors: Fabrice Riesenmey, Chalo Saint Mars (FR); Sergio Lopes, Perthes (FR); Ivan Poujol, Limours (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 115 days.

(21) Appl. No.: 15/034,950

(22) PCT Filed: Sep. 22, 2014

(86) PCT No.: PCT/FR2014/052344
§ 371 (c)(1),
(2) Date: Aug. 22, 2016

(87) PCT Pub. No.: WO2015/067862
PCT Pub. Date: May 14, 2015

(65) Prior Publication Data
US 2016/0348786 A1 Dec. 1, 2016

(30) Foreign Application Priority Data
Nov. 8, 2013 (FR) ...................... 13 60935

(51) Int. Cl.
F16H 61/16 (2006.01)
F16H 61/682 (2006.01)
(Continued)

(52) U.S. Cl.
CPC ............. F16H 61/16 (2013.01); B60K 31/12 (2013.01); B60W 40/064 (2013.01);
(Continued)

(58) Field of Classification Search
CPC .......... F16H 59/44; F16H 59/48; F16H 59/58; F16H 59/66; F16H 61/16; F16H 2061/163; B60Y 2300/022; B60Y 2300/1815
See application file for complete search history.

(56) References Cited

U.S. PATENT DOCUMENTS 5,873,802 A 2/1999 Tabata et al.
6,070,118 A * 5/2000 Ohta ................... B60K 31/0066
477/97
(Continued)

FOREIGN PATENT DOCUMENTS

EP 0 965 777 A1 12/1999
EP 1 028 241 A1 8/2000
(Continued)

OTHER PUBLICATIONS

International Search Report dated Dec. 15, 2014, in PCT/FR2014/052344 filed Sep. 22, 2014.
(Continued)

Primary Examiner — Edwin A Young
(74) Attorney, Agent, or Firm — Oblon, McClelland, Maier & Neustadt, L.L.P.

(57) ABSTRACT

A method for controlling an automatic transmission of a vehicle during cornering includes controlling opening of the transmission in response to movement of a control interface, the position data of which are transmitted to a calculation unit of the transmission by a communication network of the vehicle, based on a comparison of a measured or predicted transverse acceleration value of the vehicle with a transverse acceleration threshold calibrated as a radius of curvature of encountered or identified corners and speed and longitudinal acceleration of the vehicle on the corners.

10 Claims, 2 Drawing Sheets

(51) Int. Cl.
    *B60K 31/12*     (2006.01)
    *B60W 40/064*     (2012.01)

(52) U.S. Cl.
    CPC ...... *F16H 61/682* (2013.01); *B60Y 2300/022* (2013.01); *B60Y 2300/1815* (2013.01); *F16H 2061/163* (2013.01)

(56) References Cited

U.S. PATENT DOCUMENTS

| | | | |
|---|---|---|---|
| 6,259,994 B1 * | 7/2001 | Henneken | F16H 61/0213 477/34 |
| RE37,513 E | 1/2002 | Tabata et al. | |
| 2004/0192493 A1 | 9/2004 | Nitta | |

FOREIGN PATENT DOCUMENTS

| | | |
|---|---|---|
| EP | 1 462 682 A2 | 9/2004 |
| JP | 61-262259 A | 11/1986 |

OTHER PUBLICATIONS

French Search Report dated Jul. 30, 2014, in French Application 1360935 filed Nov. 8, 2013.

\* cited by examiner

DEVICE AND METHOD FOR CONTROLLING AN AUTOMATIC TRANSMISSION DURING CORNERING

BACKGROUND

The present invention relates to the control of automatic or automated vehicle transmissions.

More precisely, it relates to a method for controlling an automatic transmission of a vehicle during cornering.

This invention has a favored but nonlimiting application for a motor vehicle with three or four wheels, equipped with a reducer or transmission with automated control, in which the linkage between the interface or gear selector handled by the driver and the control system of the transmission is of the "shift by wire" type. The movements imparted to the interface by the driver are then encoded electrically by the interface. The encoded signals travel through a wired or multiplexed network or another optical, telemetric, etc., communication medium to the control system of the transmission, where they are decoded and used by its calculation unit.

Some gear controls of automated reducers are not provided with means preventing selection of the neutral (dead point) position without positive unlocking action by the driver on a mechanical or electromechanical prevention system. This position may then be selected in error by the driver or by the control system itself. If this incident occurs in a straight line, or on a bend at low speed, there is no immediate impact on the road holding of the vehicle. If, on the other hand, this maneuver is carried out when negotiating a tight corner at high speed and with a high engine torque, the abrupt opening of the transmission may in the worst case result in leaving the road. This problem is exacerbated when the grip coefficient of the ground or the tire is lower. Its severity depends directly on the magnitude of the transverse acceleration of the vehicle during the incident.

When the system organizing the linkage between the driver and the control of the reducer is of the "shift by wire" i.e. electrical type, there is no mechanical linkage between the selector manipulated by the driver and the transmission itself. The data decoding the driver's intention regarding the control of the transmission are transcribed into signals to be sent to the control unit of the transmission. These data generally travel through a wired or multiplexed network, or alternatively an optical, telemetric, etc., medium. The position of the gear selector or stick available to the driver in his driving seat is sent to the control unit of the transmission and, after evaluation, allows the application of control logic of electrical or electrohydraulic actuators. This logic is normally related to the direction of the movement, or the parking of the vehicle, or the suitable gearbox ratio.

In the absence of prevention means, the neutral position may therefore be selected, in error or not, even though the kinematic chain is under torque. It may then impose opening of the transmission, that is to say of the kinematic chain thereof, under insufficiently safe conditions, particularly on a bend at high speed. Abrupt opening of the transmission then risks leading to a loss of control of the vehicle because of the centrifugal force, in particular when the grip coefficient of the ground or of the tires is low.

BRIEF SUMMARY

The present invention relates to the particular problem of accidental opening of a kinematic chain at high speed on a bend, particularly in a situation with the risk of loss of control of the vehicle, due to rapid and unexpected transfer of load in the kinematic chain of the vehicle.

Its object is to avoid sudden opening of its kinematic chain under these particular conditions.

To this end, it proposes that opening of the transmission in response to the movement of a control interface, the position data of which are transmitted to the calculation unit of the transmission by a communication network of the vehicle, is controlled on the basis of a comparison of a measured or predicted transverse acceleration value of the vehicle with a transverse acceleration threshold calibrated as the radius of curvature of the encountered or identified corners and the speed and the longitudinal acceleration of the vehicle on these corners.

According to one particular embodiment of the invention, opening of the transmission is prevented when the measured transverse acceleration of the vehicle is greater than the calibrated threshold.

BRIEF DESCRIPTION OF THE DRAWINGS

The present invention will be better understood on reading the nonlimiting description of a nonlimiting embodiment thereof with reference to the appended drawings, in which FIGS. 1 and 2 respectively illustrate a case of accidental neutral request accepted and refused by the control.

DETAILED DESCRIPTION

Figure 1:
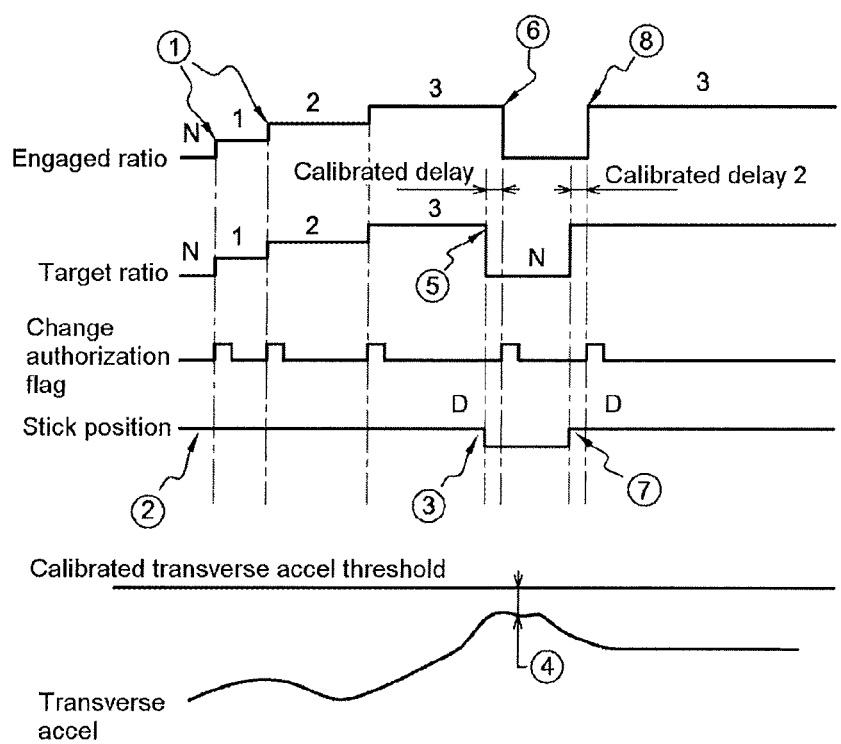

The proposed solution is based on the use, in specific control logic, of information derived mainly from the transverse acceleration of the vehicle. After evaluation, this information dictates whether or not the kinematic chain is opened. The situation envisaged is accidental movement of the control stick into the "neutral" position even though the vehicle is, or is very soon intended, to be subjected to a high centrifugal force.

The intensity of the centrifugal force being directly associated with the speed of movement of the vehicle and the radius of the bend encountered, the invention is based on detecting a transverse acceleration threshold above which the control unit of the transmission refuses to leave the engaged ratio and to open, passing into the neutral or dead point position. On the other hand, it allows the driver the possibility of changing to neutral in a straight line or on very slight bends, or even on sharper bends but at low speed. The control introduced into the transmission control therefore firstly fulfills a road safety function in response to an accidental action, but also to an intentional action by the driver on his selector. It is also justified in the scope of operations of maintenance or diagnostics of the vehicle, when an operator might initiate this maneuver inadvertently.

When the electrical gear selector is composed of a base on which a stick is articulated, angular movement is contained in the axial (X), transverse (Y) or vertical (Z) directions of the vehicle. The actions of the reducer are embodied by the conventional positions "Park" for parking; "Reverse" for reversing; "Neutral" for dead point; "Drive" for driving forward; a manual pulse mode sometimes makes it possible to change to the higher or lower ratios, at the driver's decision. All these positions may be marked and indexed by a labelling system making it possible to select the correct position and to keep the stick in this position. An electromechanical locking system most often locks the selector in Park mode, but the neutral position generally does not have one.

Each position is detected and identified by sensors, the data of which are encoded in digital or analog format then transmitted to the computer of the stick or the computer of the transmission; the encoding of these positions is directly related to the driver's intention, as well as the control of the gear ratios engaged. The algorithms managing the authorizations to start, enter "Reverse" or "Park", and to authorize changing up or down, calculate in real time the coherency between the request to change the position of the stick and the state of the transmission. Certain requests may thus be carried out or refused for reasons of energy balance, safety, performance, etc. If the driver keeps the possibility of selecting the neutral position in all circumstances, particularly cornering, safety of the path may no longer be ensured for the reasons indicated above, particularly if the linkage between the selector and the transmission is electrical.

In general, the invention provides that opening of the transmission, i.e. of the kinematic chain thereof, in response to the movement of a control interface, the position data of which are transmitted to the calculation unit of the transmission by a communication network of the vehicle, is controlled on the basis of a comparison of a measured or predicted transverse acceleration value of the vehicle with a transverse acceleration threshold calibrated as the radius of curvature of the encountered or identified corners and the speed and the longitudinal acceleration on these corners. Opening of the transmission can be prevented if the measured transverse acceleration is greater that the calibrated threshold.

The diagrams show, with reference to an example, the simultaneous variation over time of the engaged ratio, a target ratio, with the positioning of the change authorization "flags", as well as the changes in position of the stick, and the variation of the transverse acceleration. The transverse acceleration threshold is stable over the period. In FIG. 1 (the case of an accidental or intentional neutral request accepted by the control), the references 1 to 8 respectively indicate:

1) Gear ratio increases,
2) Initial positioning of the gear selector at "Drive",
3) Movement of the gear selector to "Neutral",
4) A transverse acceleration peak less than the calibrated transverse acceleration threshold,
5) Change to "Neutral",
6) Opening of the transmission after a calibrated delay,
7) Return of the selector to "Drive",
8) Return of the transmission to the current ratio.

Figure 2:
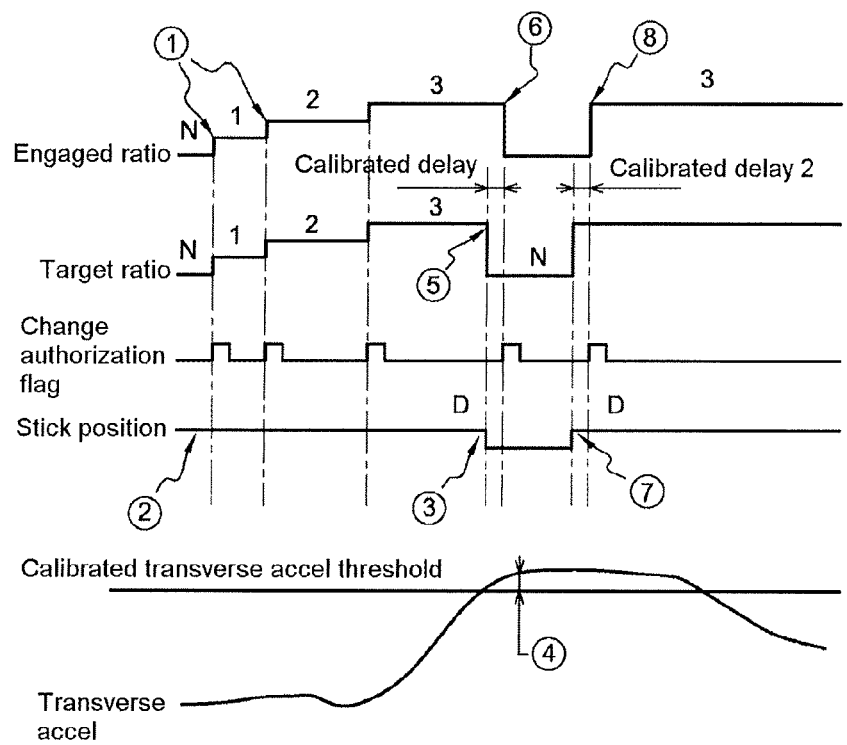

In FIG. 2 (the case of an accidental or intentional neutral request rejected by the control), the same references have been kept, but this time the transverse acceleration peak exceeds the calibrated acceleration threshold and the engaged ratio is kept. The transmission does not change to neutral despite the movement of the stick. This is because, in view of the level of transverse acceleration, the movement of the selector is carried out in a dangerous context, so the engaged ratio is kept and the transmission does not open.

The transverse acceleration may be provided to the calculation unit of the transmission either directly by an accelerometer or by measurement on the differential of the transmission in correlation with the average speed of the chassis. It may also be calculated "predictively", for example using GPS data or other remote measurement means. Specifically, if the vehicle is provided with a "GPS" system, the data relating to the positioning of the vehicle on the map, to its movement conditions or its route, may be used in order to evaluate in real time or predictively the safety context in which it is moving. By estimating the average acceleration to which the vehicle will be submitted on the bends to be negotiated in the short term, it becomes possible to "predict" the transverse acceleration of the vehicle on its route in order to prevent opening of the transmission when entering regions identified as hazardous on a programmed route. The hazardous regions may be identified as a function of the average radii of the bends present on the route of the vehicle. The prevention of opening of the transmission in a hazardous region depends on an estimate of the transverse acceleration to which the vehicle will be submitted on the bends in this region. It is then not necessary for the vehicle to experience the maximum allowed transverse acceleration in order to prevent opening of the transmission.

One practical way of estimating the transverse acceleration in the hazardous regions is based on the average speed of the vehicle and the braking gradients identified under similar driving conditions. In the case of such "predictive" prevention in a hazardous region, the prevention of opening of the transmission is suspended when leaving this region, or if the transverse acceleration returns below the calibrated threshold.

Whether the transverse acceleration taken into account is "predictive" or "real", the invention provides for the introduction of a corrective term, such as a grip coefficient, in the control logic, in relation to the motivity of the vehicle. This term reflects the grip of the vehicle on the ground, as a function of the nature of the surface of the ground and the tires. One of the purposes of this corrective term is to prevent opening of the transmission on an icy corner even at a very low speed. It is taken into account in order to optimize the level of transverse acceleration beyond which the strategy may be activated. For a snowy road, for example, the strategy will be activated with a lower level of transverse acceleration than on a dry road.

The grip depends both on the condition of the tire, the type of road taken and the weather conditions. There are different ways of assessing the grip of the vehicle, including stored data regarding the history of the motivity of the vehicle since it set off, calculated for example by path monitoring or braking monitoring systems. The estimates of the motivity power may also be based on the difference in speed between the average of the driving wheels and the average of the nondriving wheels, in order to assign a value or "grade" to the grip coefficient which is applied to the calibrated acceleration threshold. The calibrated transverse acceleration threshold is multiplied by the grip coefficient in order to obtain the final threshold:

Final_transverse_accel_threshold=(grip_coeff)*(calibrated transverse_accel_threshold).

In conclusion, the invention relates to situations in which movement of the stick to the neutral position is physically possible but may prove dangerous. It introduces evaluation which leads, or does not lead, to the instruction to request opening of the transmission being carried out. In the event of prevention, the transmission is locked on its current ratio for as long as the prevention lasts. Lastly, a visual or audible warning may be given in order to inform the driver that the prevention has been initiated.

The invention claimed is:
1. A method for controlling an automatic transmission of a vehicle during cornering, comprising:
controlling opening of the transmission in response to movement of a control interface, position data of which are transmitted to a calculation unit of the transmission by a communication network of the vehicle, based on a comparison of a measured or predicted transverse acceleration value of the vehicle with a transverse acceleration threshold calibrated as a radius of curvature of encountered or identified corners and speed and longitudinal acceleration of the vehicle on the corners.

2. The method for controlling an automatic transmission as claimed in claim 1, wherein the opening of the transmission is prevented when the measured transverse acceleration of the vehicle is greater than the calibrated threshold.

3. The method for controlling an automatic transmission as claimed in claim 2, wherein the opening of the transmission is prevented when the vehicle enters hazardous regions identified on a route of the vehicle.

4. The method for controlling an automatic transmission as claimed in claim 3, wherein the hazardous regions are identified as a function of an average radius of bends present on the route.

5. The method for controlling an automatic transmission as claimed in claim 4, wherein the prevention of the opening of the transmission in the hazardous regions depends on an estimate of the transverse acceleration to which the vehicle will be submitted on the bends of the region.

6. The method for controlling an automatic transmission as claimed in claim 5, wherein the transverse acceleration in the hazardous regions is estimated as a function of an average speed of the vehicle and predetermined braking gradients.

7. The method for controlling an automatic transmission as claimed in claim 3, wherein the prevention of the opening of the transmission is suspended when leaving a hazardous region, or if the transverse acceleration returns below the calibrated threshold.

8. The method for controlling an automatic transmission as claimed in claim 1, wherein the movement of the control interface includes a gear selector of the transmission being moved from an engaged ratio position, or drive position, to a neutral or dead point position.

9. The method for controlling an automatic transmission as claimed in claim 2, wherein the transmission is locked on a current ratio during the prevention of the opening of the transmission.

10. The method for controlling an automatic transmission as claimed in claim 1, wherein the calibrated transverse acceleration threshold is multiplied by a grip coefficient.

* * * * *